(12) United States Patent
Wang et al.

(10) Patent No.: US 12,096,171 B2
(45) Date of Patent: Sep. 17, 2024

(54) MICROPHONE SHOCK MOUNT

(71) Applicants: Yifei Wang, Pomona, CA (US); Yifan Wang, Pomona, CA (US)

(72) Inventors: Yifei Wang, Pomona, CA (US); Yifan Wang, Pomona, CA (US)

( * ) Notice: Subject to any disclaimer, the term of this patent is extended or adjusted under 35 U.S.C. 154(b) by 171 days.

(21) Appl. No.: 17/822,095

(22) Filed: Aug. 24, 2022

(65) Prior Publication Data

US 2024/0073572 A1 Feb. 29, 2024

(51) Int. Cl.
*H04R 1/08* (2006.01)
*F16F 7/14* (2006.01)
*F16F 15/08* (2006.01)

(52) U.S. Cl.
CPC ............. *H04R 1/083* (2013.01); *F16F 7/14* (2013.01); *F16F 15/08* (2013.01)

(58) Field of Classification Search
CPC .................................................. H04R 1/083
See application file for complete search history.

(56) References Cited

U.S. PATENT DOCUMENTS

| | | | | |
|---|---|---|---|---|
| 4,514,598 A | * | 4/1985 | Plice | H04R 1/08 248/104 |
| 4,546,950 A | * | 10/1985 | Cech | F16F 1/46 381/361 |
| 6,424,723 B1 | * | 7/2002 | Jing | H04R 1/08 381/361 |
| 10,575,078 B2 | * | 2/2020 | Slaton | F16F 7/14 |

* cited by examiner

*Primary Examiner* — Andrew Sniezek
(74) *Attorney, Agent, or Firm* — Tsz Lung Yeung

(57) ABSTRACT

A microphone shock mount includes a mounting base, and a shock absorption assembly. The shock absorption assembly includes an outer support frame, an inner support frame and at least one resilient element. The outer support frame has a central opening connected to and extending from the mounting base. The inner support frame is supported in the central opening of the outer support frame, and has a through supporting slot. The resilient element extends between the outer support frame and the inner support frame so as to suspendedly support the inner support frame within the outer support frame. The microphone stem is adapted to fittedly penetrate the supporting slot and to be detachably mounted on the inner support frame in such a manner that external shocks and vibrations are capable of being absorbed by the resilient element so as to effectively prevent vibrations from transmitting to the microphone.

7 Claims, 6 Drawing Sheets

MICROPHONE SHOCK MOUNT

BACKGROUND OF THE PRESENT INVENTION

Field of Invention

The present invention relates to a microphone, and more particularly to a microphone shock mount which is capable of effectively preventing noise and vibrations from affecting a normal operation of the microphone.

Description of Related Arts

A microphone is sensitive to wind noise and all sorts of mechanical vibrations such as shocks to a boom or attached support apparatus. Lots of devices have been designed to reduce shock-related noise. For instances, U.S. Pat. No. 4,991,220 disclosed an elastic loop supporting a microphone. However, this structure cannot adequately support the microphone and especially the head portion of the microphone. U.S. Pat. No. 6,459,802 disclosed a tubular shell with several runs of stretch-cord to support microphone away from a rigid support stand. However, the performance of this design is far from satisfactory.

Moreover, when using a regular microphone suspension system, vibration noise at or close to a rubber resonant frequency of the suspended microphone is still transmitted to the microphone. This resonant frequency is unpredictable depending on the degree of tightness caused by the replacement of a rubber ring and a diameter of the microphone. In extremely demanding situations such as film sound pickup, the microphone has to move constantly to follow the actors. Very often, the staff is trained to be very careful, but it is still difficult to avoid vibration noise which may be transmitted to the microphone.

Therefore, there is a need to develop microphone shock mount which is capable of effectively preventing noise or vibrations from affecting a normal operation of the microphone.

SUMMARY OF THE PRESENT INVENTION

Certain variations of the present invention provide a microphone shock mount which is capable of effectively preventing noise or vibrations from affecting a normal operation of the microphone.

Certain variations of the present invention provide a microphone shock mount comprising an inner support frame in which a microphone stem is mounted on the inner support frame so that shocks and vibrations are substantially absorbed by at least one resilient element. As such, the present invention is capable of effectively preventing vibrations from transmitting to the microphone.

Certain variations of the present invention provide a microphone shock mount comprising an inner support frame and an outer support frame which provide a double suspension system for a microphone.

In one aspect of the present invention, it provides a microphone shock mount for a microphone having a microphone stem, the microphone shock mount comprising:

a mounting base; and a shock absorption assembly, which comprises:

an outer support frame having a central opening connected to and extending from the mounting base;

an inner support frame which is supported in the central opening of the outer support frame, and has a through supporting slot; and at least one resilient element having a predetermined elasticity extending between the outer support frame and the inner support frame so as to suspendedly support the inner support frame within the outer support frame, the microphone stem being adapted to penetrate the supporting slot and be detachably mounted on the inner support frame in such a manner that external shocks and vibrations are being absorbed by the resilient element so as to effectively prevent vibrations from transmitting to the microphone.

This summary presented above is provided merely to introduce certain concepts and not to identify any key or essential features of the claimed subject matter.

DETAILED DESCRIPTION OF THE PREFERRED EMBODIMENT

Figure 1:
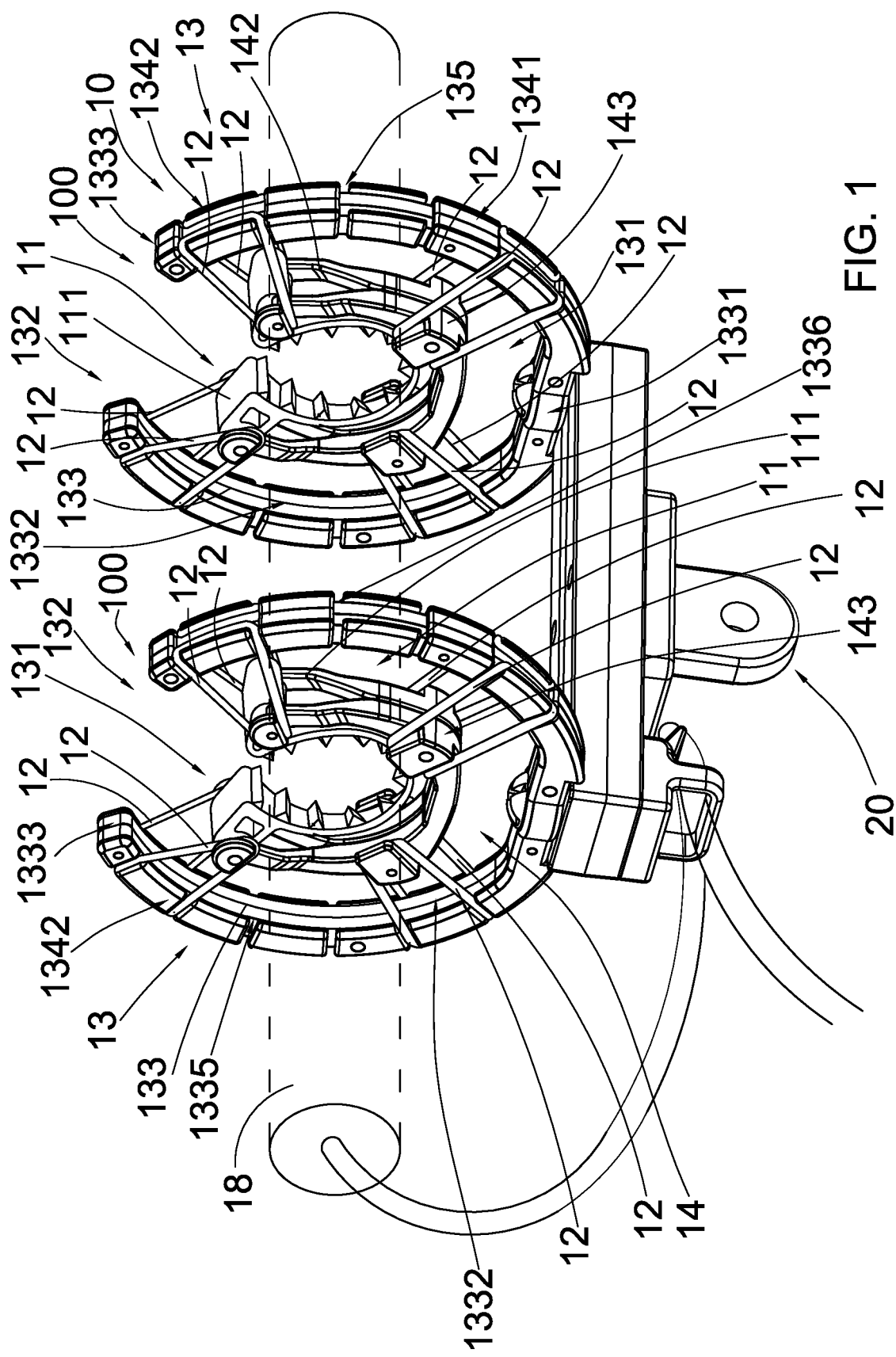
FIG. 1 is a perspective view of a microphone shock mount according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" can refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Referring to FIG. 1 to FIG. 7 of the drawings, a microphone shock mount according to a preferred embodiment of the present invention is illustrated. The microphone shock mount may comprise a mounting base 20, and at least one shock absorption assembly 100. The shock absorption assembly 100 may comprise an outer support frame 13, an inner support frame 14, and at least one resilient element 12. The microphone shock mount may be used for suspendedly supporting a microphone having a microphone stem 18.

The outer support frame 13 may have a central opening 131 and may be connected to and extending from the mounting base 20.

The inner support frame 14 may be supported in the central opening 131 of the outer support frame 13, and have a through supporting slot 141.

The resilient element 12 may have a predetermined elasticity extending between the outer support frame 13 and the inner support frame 14 so as to suspendedly support the inner support frame 14 within the outer support frame 13. The microphone stem 18 may be adapted to penetrate the supporting slot 141 and may be detachably mounted on the inner support frame 14 in such a manner that external shocks and vibrations are being absorbed by the resilient element 12 so as to effectively prevent vibrations from transmitting to the microphone.

As shown in FIG. 1 of the drawings, the outer support frame 13 may further have a top opening 132 communicating with the central opening 131 so that the outer support frame 13 as a whole may form a substantially ring-shaped or chestnut-shaped structure having the top opening 132 formed thereof. According to the preferred embodiment of the present invention, the outer support frame 13 may comprise a main frame 133 and a plurality of securing members 134 attached on the main frame 133 in such a manner that each of the securing members 134 may be spaced apart from the adjacent securing members 134 so as to form a securing groove 135 between each adjacent securing member 134.

The main frame 133 may have a bottom portion 1331 attached on the mounting base 20 (described below), and two arm portions 1332 upwardly extending from the bottom portion 1331. Each of the arm portions 1332 may have a curved and elongated structure and upwardly extend from a corresponding end of the bottom portion 1331 of the main frame 133 to form the chestnut-shaped or ring-shaped structure of the outer support frame 13, wherein the top opening 132 may be constituted by the space formed between upper ends 1333 of the arm portions 1332 respectively. Similarly, the central opening 131 of the outer support frame 13 may be constituted by the space surrounded by the two arm portions 1332 and the bottom portion 1331.

In one embodiment, the main frame 133 may be constituted by an elongated and outwardly curved rigid band having a certain amount of deformability. Each of the securing members 134 may have a U-shaped cross section and may be attached on the main frame 133 to cover at least a front surface and a rear surface thereof. Specifically, the securing members 134 may be attached on the arm portions 1332 in such a manner that each two adjacent securing members 134 may be attached on the arm portions 1332 of the main frame 133 from an outer side and an inner side thereof respectively. This configuration may be shown in FIG. 1 of the drawings. As shown in FIG. 1 of the drawings, each of the securing members 134 may have a cover portion 1341, and two leg portions 1342 extending from the cover portion to form the U-shaped cross section. The securing groove 135 may be formed between each two adjacent securing members 134.

The bottom portion 1331 of the outer support frame 13 may be mounted on the mounting base 20 (described below) which may then be mounted on an external object for securing the microphone on that external object with minimal vibrations.

On the other hand, the inner support frame 14 may be suspendedly supported within the central opening 131 of the outer support frame 13. As shown in FIG. 1 to FIG. 4 of the drawings, the inner support frame 14 may comprise an inner frame member 142 having a base portion 1421 and two extension portions 1422 upwardly extended from the base portion 1421, wherein the through supporting slot 141 may be constituted by the space surrounded by the base portion 1421 and the extension portions 1422. The microphone stem 18 may be arranged to penetrate through the through supporting slot 141 and supported by the microphone shock mount of the present invention.

Figure 2:
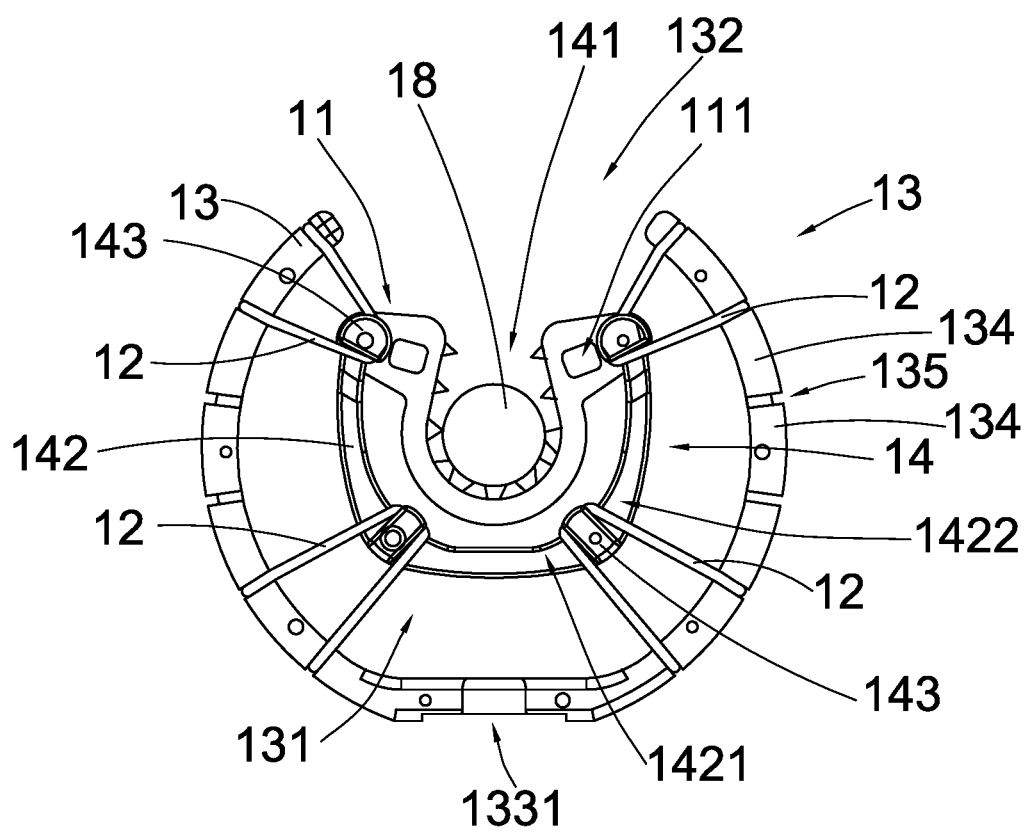
FIG. 2 is a front view of the microphone shock mount according to the preferred embodiment of the present invention, illustrating that a microphone stem is being disposed in an inner support frame.
Figure 3:
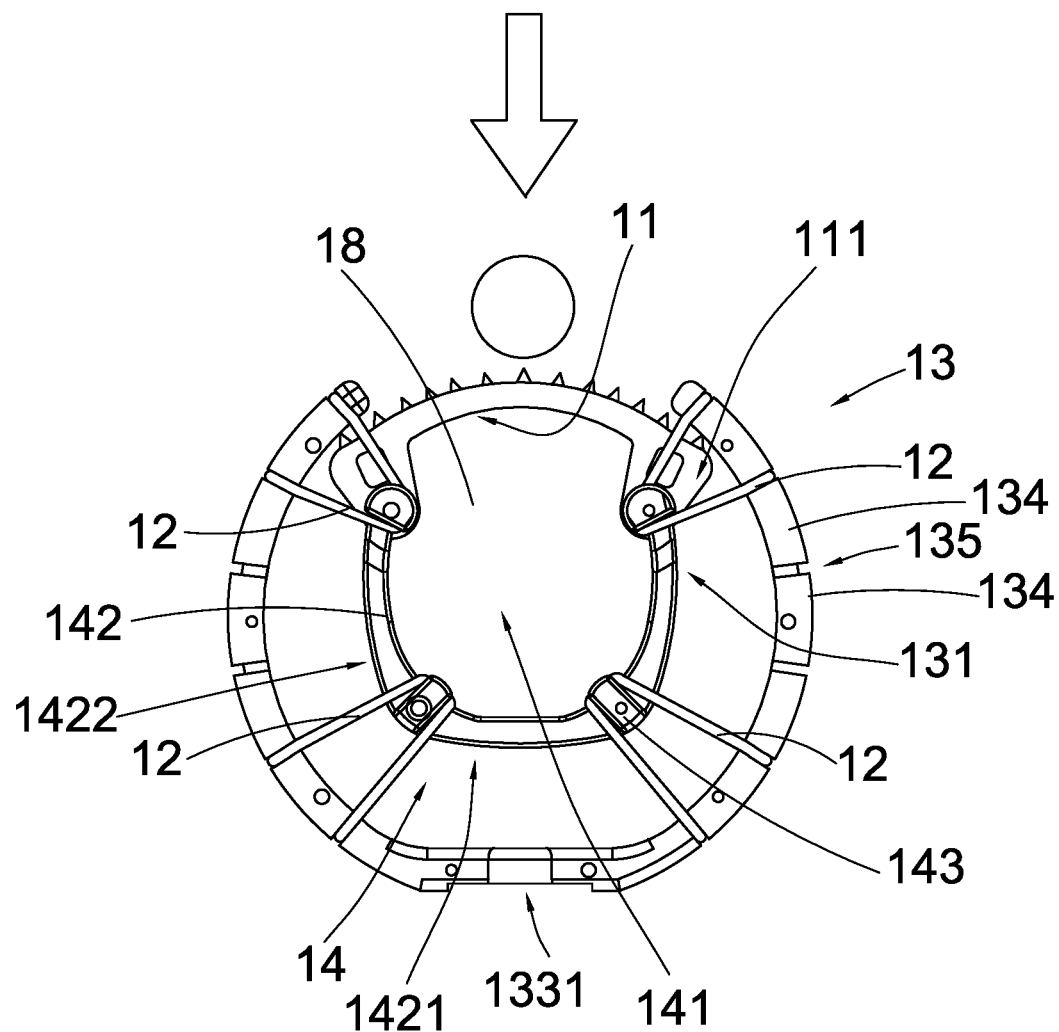
FIG. 3 is a front view of the microphone shock mount according to the preferred embodiment of the present invention, illustrating that an inner ring frame may be adjusted to fit microphone stem of different diameters.

Referring to FIG. 2 to FIG. 3 of the drawings, the inner support frame 14 may further comprise a plurality of securing anchors 143 protruded from the inner frame member 142, wherein the resilient element 12 may attach at least one of the securing anchors 143 for detachably coupling with the inner support frame 14. According to the preferred embodiment of the present invention, the microphone shock mount may comprise a plurality of resilient elements 12 in which each of the resilient elements 12 may be configured as an elastic rubber band having one end coupling with a corresponding securing anchor 143.

Thus, the resilient elements 12 may extend from the securing anchors 143 respectively to detachably couple with the outer support frame 13. More specifically, each of the resilient elements 12 may be received in a corresponding securing groove 135 and fasten around an adjacent leg portion 1342 of the corresponding securing member 134 so as to detachably attach the resilient element 12 to the outer support frame 13. This configuration may be shown in FIG. 1 of the drawings. It is worth mentioning that since each of the resilient elements 12 may have a predetermined elasticity, vibration and external shocks imparted on the microphone shock mount of the present invention may be significantly absorbed by the resilient elements 12. In this preferred embodiment, there are altogether eight resilient elements 12 for each microphone shock mount.

Moreover, as shown in FIG. 1 of the drawings, a microphone stem 18 may be supported by several (such as two or three) shock absorption assemblies 100. However, several shock absorption assemblies 100 may be supported by a single mounting base 20. In this case, the microphone stem 18 may penetrate through the through supporting slots 141 of all the shock absorption assemblies 100 supported on the mounting base 20. Obviously, depending on the type of microphones and the circumstances in which the microphone is to be used, a user may freely utilize any number of shock absorption assemblies 100 and the mounting base 20.

Each of the extension portions 1422 may be outwardly curved when extending from the base portion 1421. In order to enhance support stability for the microphone, the inner support frame 14 may have a plurality of teeth 1423 inwardly extended in through supporting slot 141 so that when the microphone stem 18 is received in the through supporting slot 141, the teeth 1423 may be arranged to bias against the microphone stem 18 so as to further secure the position of the microphone with respect to the microphone shock mount of the present invention.

Specifically, the inner support frame 14 may further comprise a microphone clamping device 11 movably attached on the inner frame member 142, wherein the teeth 1423 may extend from the microphone clamping device 11 to bias against the microphone stem 18. Referring to FIG. 1 to FIG. 3 of the drawings, the microphone clamping device 11 may comprise a deformable member 111 connected to and movably extending between the two extension portions 1422 of the inner frame member 142. The deformable member 111 may be configured from deformable and soft material, such as rubber, so that the deformable member 111 may be pivotally flipped about the extension portions 1422 to adjust a size of the through supporting slot 141.

As shown in FIG. 2 of the drawings, the deformable member 111 may be bent and deform to form a substantially U-shaped support in the space between the two extension portions 1422, wherein the through supporting slot 141 may be formed within this U-shaped contour.

Figure 5:
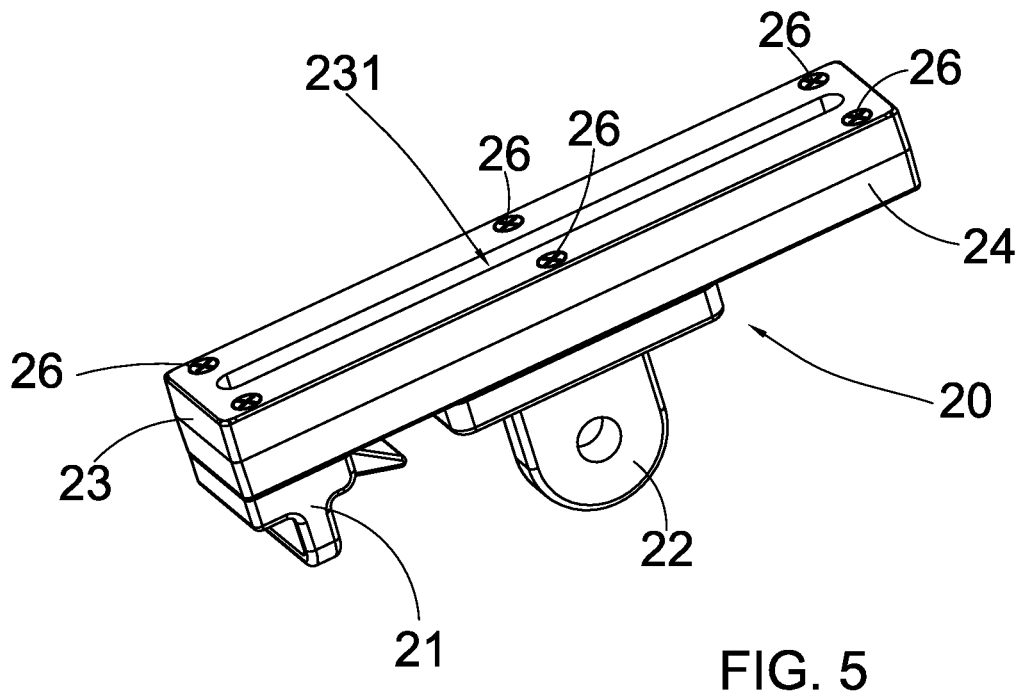
FIG. 5 is a perspective view of a mounting base of the microphone shock mount according to the preferred embodiment of the present invention.
Figure 6:
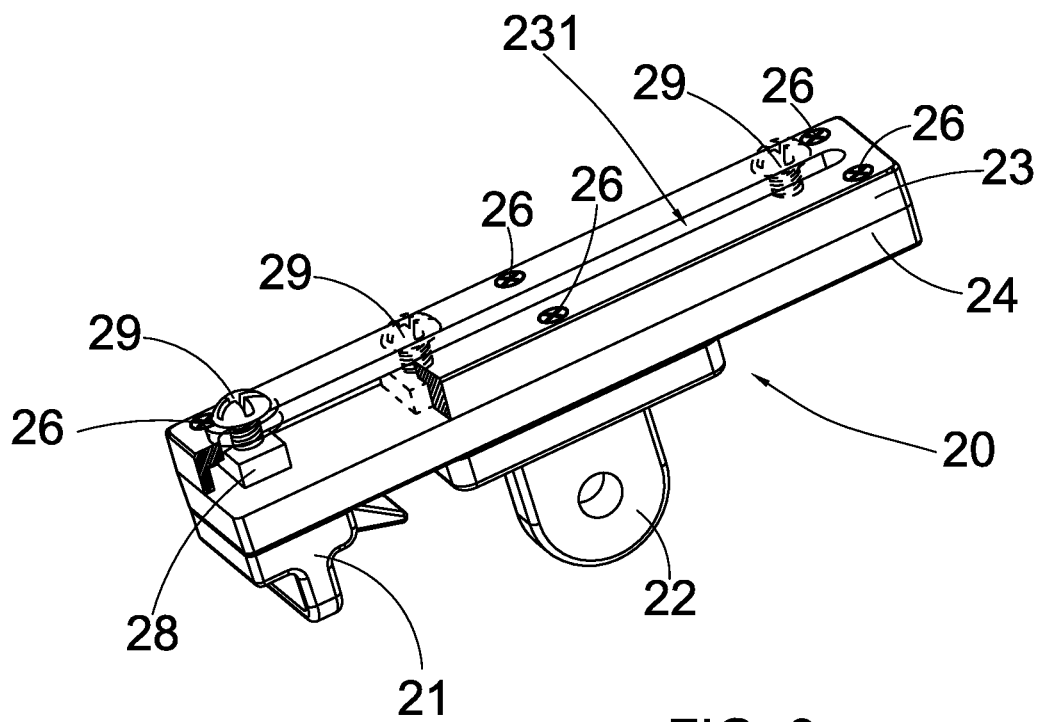
FIG. 6 is another perspective view of the mounting base of the microphone shock mount according to the preferred embodiment of the present invention.
Figure 7:
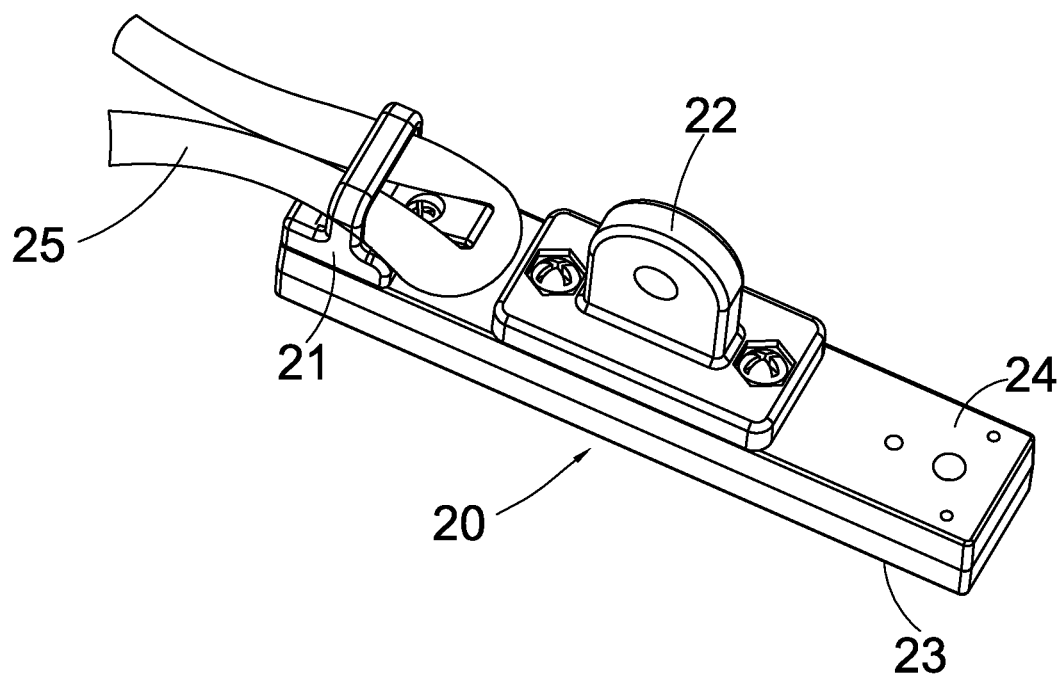
FIG. 7 is another perspective view of the mounting base of the microphone shock mount according to the preferred embodiment of the present invention.

Referring to FIG. 5 to FIG. 7 of the drawings, the mounting base 20 may comprise a first base member 23 and a second base member 24 attached on the first base member 23. The first base member 23 and the second base member 24 may be securely connected by a plurality of connecting bolts 26. Hence, there may not be any relative movement between the first base member 23 and the second base member 24. Each of the first base member 23 and the second base member 24 may have a quadrilateral cross sectional shape. Other shapes may also be possible.

The first base member 23 may have an elongated sliding slot 231 extending along a longitudinal direction thereof. The mounting base 20 may comprise a plurality of sliding connectors 29 slidably mounted in the elongated sliding slot 231, wherein the sliding connectors 29 may be mounted to the outer support frame 13 so that when the sliding connectors 29 slide along the elongated sliding slot 231, the outer support frame 13 and the entire shock absorption assemblies 100 may also slide with respect to the first base member 23 accordingly. According to the preferred embodiment of the present invention, each of the sliding connectors 29 may be configured as a screw slidably mounted in the elongated sliding slot 231.

On the other hand, the second base member 24 may be securely affixed on an external object, preferably through an adaptor 22, for providing support to the shock absorption assemblies 100. The adaptor 22 may be configured as a universal supporting adaptor for a boom pole.

As shown in FIG. 7 of the drawings, a bottom perspective view of the mounting base 20 is illustrated. A clamping device 21 may be provided on the second base member 24 by a bolt for a microphone cable 25 to hold in place.

The operation of the present invention is as follows: a microphone having a microphone stem 18 may be supported by several (such as two) shock absorption assemblies 100. The shock absorption assemblies 100 may be connected to the sliding connectors 29 which may be slidably connected to the first base member 23. The second base member 24 may be connected to an external object.

Figure 4:
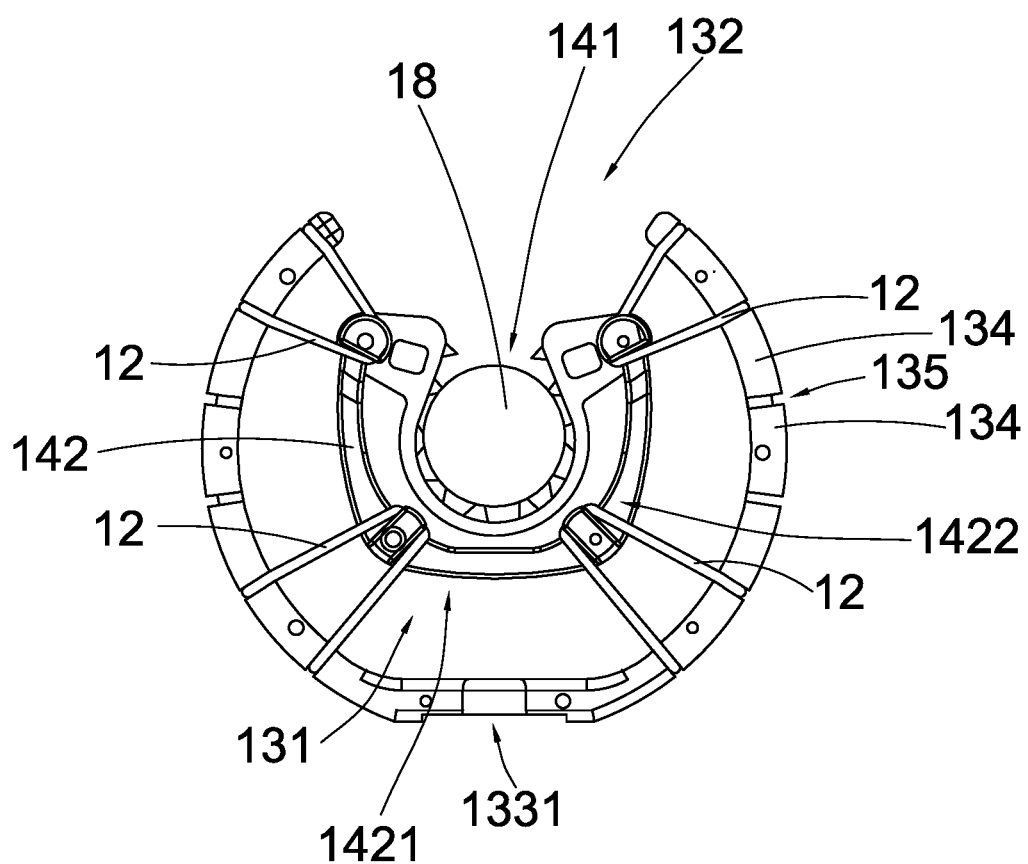
FIG. 4 is a front view of the microphone shock mount according to the preferred embodiment of the present invention, illustrating that a microphone stem of different diameter is disposed in an inner support frame.

FIG. 2 to FIG. 4 illustrate the manner in which the microphone stem 18 may be engaged with or supported by one shock absorption assembly 100. As shown in FIG. 3 of the drawings, the microphone clamping device 11, due to its elasticity, may be flipped with respect to the inner frame member 142 so that the teeth 1423 may face outwardly with respect to the inner frame member 142. A user is able to dispose the microphone stem 18 on the microphone clamping device 11 and exert a downward force thereto so as to push the microphone clamping device 11 to restore to its original shape. When the user continues pushing the microphone stem 18 down the through supporting slot 141, the microphone clamping device 11 may restore to original shape and form a substantially U-shape structure for securely clamping the microphone stem 18 through the teeth 1423. As such, the microphone stem 18 may be securely supported by the inner frame member 142. External shocks may be effectively absorbed by the resilient elements 12.

From the forgoing description, it can be shown that the microphone shock mount of the present invention utilizes double suspension technology in which the outer support frame 13 and the inner support frame 14 have different cross-sectional area. It is worth mentioning that the outer support frame 13 and the inner support frame 14 may be arranged to filter noise of different resonant frequencies so that when the microphone is in use, the probability of having simultaneous vibrations with the same two resonance frequencies is very small. Because of the use of the resilient elements 12, the microphone can be supported in maximal stability and microphone stems 18 of differing diameters may be easily fitted in the microphone shock mount of the present invention.

The present invention, while illustrated and described in terms of a preferred embodiment and several alternatives, is not limited to the particular description contained in this specification. Additional alternative or equivalent components could also be used to practice the present invention.

What is claimed is:

1. A microphone shock mount for a microphone having a microphone stem, said microphone shock mount comprising:
   a mounting base; and
   a shock absorption assembly, which comprises:
   an outer support frame having a central opening connected to and extending from said mounting base, and a top opening communicating with said central opening to form a substantial ring-shaped structure of said outer support frame, said outer support frame further comprising a main frame and a plurality of securing members attached on said main frame in such a manner that each of said securing members is spaced apart from said adjacent securing members so as to form a securing groove between each adjacent securing member, said main frame having a bottom portion attached on said mounting base, and two arm portions upwardly extending from said bottom portion, each of said arm portions having a curved and elongated structure and upwardly extending from a corresponding end of said bottom portion of said main frame to form said substantially ring-shaped structure of said outer support frame, wherein said top opening is constituted by a space formed between upper ends of said arm portions respectively, said central opening of said outer support frame being surrounded by said two arm portions and said bottom portion, wherein each of said securing members has a U-shaped cross section and is attached on said main frame to cover at least a front surface and a rear surface thereof, said securing members being arranged to be attached on said arm portions in such a manner that each two adjacent securing members are attached on said arm portions of said main frame from an outer side and an inner side thereof respectively;

an inner support frame which is supported in said central opening of said outer support frame, and has a through supporting slot; and at least one resilient element having a predetermined elasticity extending between said outer support frame and said inner support frame so as to suspendedly support said inner support frame within said outer support frame, said microphone stem being adapted to penetrate said supporting slot and be detachably mounted on said inner support frame in such a manner that external shocks and vibrations are being absorbed by said resilient element so as to effectively prevent vibrations from transmitting to said microphone.

2. The microphone shock mount, as recited in claim 1, wherein each of said securing members has a cover portion, and two leg portions extending from said cover portion to form said U-shaped cross section, said securing groove being formed between each two adjacent securing members.

3. The microphone shock mount, as recited in claim 2, wherein said inner support frame comprises an inner frame member having a base portion and two extension portions upwardly extended from said base portion, wherein said through supporting slot is constituted by a space surrounded by said base portion and said extension portions.

4. The microphone shock mount, as recited in claim 3, wherein said inner support frame further comprises a plurality of securing anchors protruded from said inner frame member, wherein said resilient element is arranged to attach on at least one of said securing anchors for detachably coupling with said inner support frame, said resilient element extending between said corresponding securing anchor and said corresponding securing groove.

5. The microphone shock mount, as recited in claim 4, wherein said inner support frame further comprises a microphone clamping device movably supported by said outer support frame, and a plurality of teeth extending from said microphone clamping device to bias against said microphone stem when said microphone stem is received in said through supporting slot.

6. The microphone shock mount, as recited in claim 5, wherein said microphone clamping device comprises a deformable member connected to and movably extending between said two extension portions of said inner frame member, said deformable member being configured from deformable and soft material so that said deformable member is adapted to be pivotally flipped about said extension portions to adjust a size of said through supporting slot.

7. The microphone shock mount, as recited in claim 6, wherein said mounting base comprises a first base member and a second base member attached thereon, said first base member having an elongated sliding slot extending along a longitudinal direction thereof, said mounting base further comprising at least one sliding connector slidably mounted in said elongated sliding slot, wherein said sliding connector is mounted to said outer support frame so that when said sliding connector slides along said elongated sliding slot, said outer support frame also slides with respect to said first base member accordingly.

\* \* \* \* \*